United States Patent [19]

Kersey

[11] Patent Number: 5,206,924
[45] Date of Patent: Apr. 27, 1993

[54] FIBER OPTIC MICHELSON SENSOR AND ARRAYS WITH PASSIVE ELIMINATION OF POLARIZATION FADING AND SOURCE FEEDBACK ISOLATION

[75] Inventor: Alan D. Kersey, Springfield, Va.

[73] Assignee: The United States of America as represented by the Secretary of the Navy, Washington, D.C.

[21] Appl. No.: 937,782

[22] Filed: Sep. 1, 1992

Related U.S. Application Data

[63] Continuation of Ser. No. 828,826, Jan. 31, 1992, abandoned.

[51] Int. Cl.⁵ ............................................. G02B 6/28
[52] U.S. Cl. .................................. 385/24; 385/12; 356/351; 250/227.27
[58] Field of Search .............. 250/227.27, 227.19; 356/349, 350, 345, 351; 385/11, 12, 24

[56] References Cited

U.S. PATENT DOCUMENTS 4,588,296 5/1986 Cahill et al. ..................... 356/350
4,929,050 5/1990 Wilson ................................ 385/12

OTHER PUBLICATIONS

"A Universal Compensator for Polarization Changes Induced by Birefringence on a Retracing Beam", by Mario Martinelli, Optics Communications, vol. 72, No. 6; 15 Aug., 1989; pp. 341-344.

Primary Examiner—John D. Lee
Assistant Examiner—John Ngo
Attorney, Agent, or Firm—Thomas E. McDonnell; George Jameson

[57] ABSTRACT

A fiber optic Michelson interferometric sensor system with passive elimination of polarization fading and source feedback isolation is disclosed. In a preferred embodiment, an optical source provides light of a first polarization state to a polarization selective element. Output light from the polarization selective element passes through a length of optical fiber into a Michelson interferometric sensor which utilizes a Faraday rotator/mirror assembly, that is coupled to distal ends of sensing and reference arms of the Michelson interferometer, to provide for the passive elimination of polarization fading. The polarization selective element at the output of the optical source provides isolation of the optical source from the Michelson interferometer sensor.

18 Claims, 6 Drawing Sheets

FIBER OPTIC MICHELSON SENSOR AND ARRAYS WITH PASSIVE ELIMINATION OF POLARIZATION FADING AND SOURCE FEEDBACK ISOLATION

This is a continuation of co-pending application Ser. No. 07/828,826 filed on Jan. 31, 1992, now abandoned.

BACKGROUND OF THE INVENTION

1. Field of the Invention

The present invention relates to fiber optic sensors and particularly to a fiber optic Michelson interferometric sensor system which provides for the passive elimination of polarization fading and for the isolation of the optical source from feedback from the fiber optic interferometer sensor system.

2. Description of the Prior Art

The use of interferometric fiber optic sensors constructed using conventional low birefringence fiber presents two problems which bear on the effectiveness of those sensors in various sensing applications.

First, in such interferometric fiber optic sensors, random fluctuations in the state of polarization (SOP) of the interfering beams give rise to variations in the output fringe visibility, and consequently fading of the detected interferometric signal. This 'polarization-induced fading' phenomenon is an important problem which affects the practical applicability of interferometric sensors in a number of application areas.

Second, typical Michelson interferometric fiber optic sensor systems apply light from an optical source or laser through a 3 dB optical coupler to the interferometric fiber optic sensor. The returned signal light returns to this optical coupler, with one-half of this returned signal light passing through one port of the optical coupler to an optical detector and the other half of this returned signal light passing through another port of the optical coupler back toward the laser. This returned signal light not only results in a power loss but can also be detrimental the laser, particularly when the laser is a diode laser. Thus, there is a need to isolate the optical source or laser from the signal light returned from the interferometric fiber optic sensor system to prevent possible damage to the laser and to also minimize power loss in the signal light before it is detected.

FIRST PROBLEM

In relation to the first problem, several approaches have been used to overcome the effect of 'polarization-induced fading', including simple manual or automatic polarization controllers in the arms of the fiber interferometer, input polarization control/modulation-based approaches, and 'polarization diversity' detection schemes. An obvious alternative approach is to construct the interferometer using high-birefringence, 'polarization preserving' (PM) fiber. This approach, however, has met with little success due to the complexity and cost in constructing the interferometer using PM components.

Recently, a technique has been proposed for the compensation of birefringence effects in a length of fiber which is retraced by an optical beam. This technique has demonstrated that, for an optical beam which retraces its path in a fiber, the insertion of a Faraday rotator and mirror at the end of the fiber results in a state of polarization (SOP) at the exit which is orthogonal to the SOP at the entrance to the fiber. Thus, the basis of operation of the above-described technique is the use of a 'Faraday rotator mirror' (FRM) to reflect the optical signal back along the fiber path. Using such an element with a single pass rotation of 45°, the polarization evolution in the fiber in one direction is essentially 'unwound' in the reverse direction, producing a returned SOP which is stable in time irrespective of the birefringence properties of the fiber link (assuming that the birefringence properties change at a rate much lower than the round trip transit time of the light in the fiber). In a second technique, the use of nonreciprocal rotation elements in a Michelson configuration was proposed as a means of passive stabilization against polarization fading due to environmental birefringence perturbations. At the point of recombination the SOP from each of the interferometer arms is orthogonal to the common SOP at the entrance point and consequently they are aligned with each other to insure maximum fringe visibility.

SECOND PROBLEM

At the present time, the most commonly used method for providing isolation between the returning signal light and the exemplary diode laser is the insertion of an optical isolator between the input fiber and the diode laser. But this method has to provide an extremely high degree of isolation—probably at least 60 dB of attenuation—in order for this method to work well. However, this method still has at least a 6 dB power loss in the signal light being detected.

Thus, there is a need in the field of fiber optic sensor systems for a fiber optic Michelson interferometric sensor system which provides passive elimination of polarization-induced fading to maximize visibility, provides isolation of an optical source from the relatively strong optical signal returned from the Michelson configuration, and minimizes power loss in the returned optical signal.

OBJECTS OF THE INVENTION

Accordingly, one object of the invention is to provide an improved fiber optic Michelson interferometric sensor system.

Another object of the invention is to provide a fiber optic Michelson interferometric sensor system which provides passive elimination of polarization fading and source feedback isolation.

A further object of the invention is to provide a fiber optic array of Michelson interferometer sensors which provides for the passive elimination of polarization fading in each branch of the array and also provides isolation of the optical source from the reflective array.

SUMMARY OF THE INVENTION

A fiber optic Michelson interferometric sensor system with passive elimination of polarization fading and source feedback isolation is disclosed. In operation, an optical source provides light of a first polarization state to a polarization selective element. Output light from the polarization selective element passes through a length of optical fiber into one or more Michelson interferometric sensor branches. Each branch utilizes an associated Faraday rotator/mirror assembly, which assembly is coupled to distal ends of sensing and reference arms of the Michelson interferometer sensor in that branch, to provide for the passive elimination of polarization fading in that branch. The polarization selective element at the output of the optical source provides isolation of the optical source from the returned optical signals from the Michelson interferometer sensor system.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENTS

Figure 1:
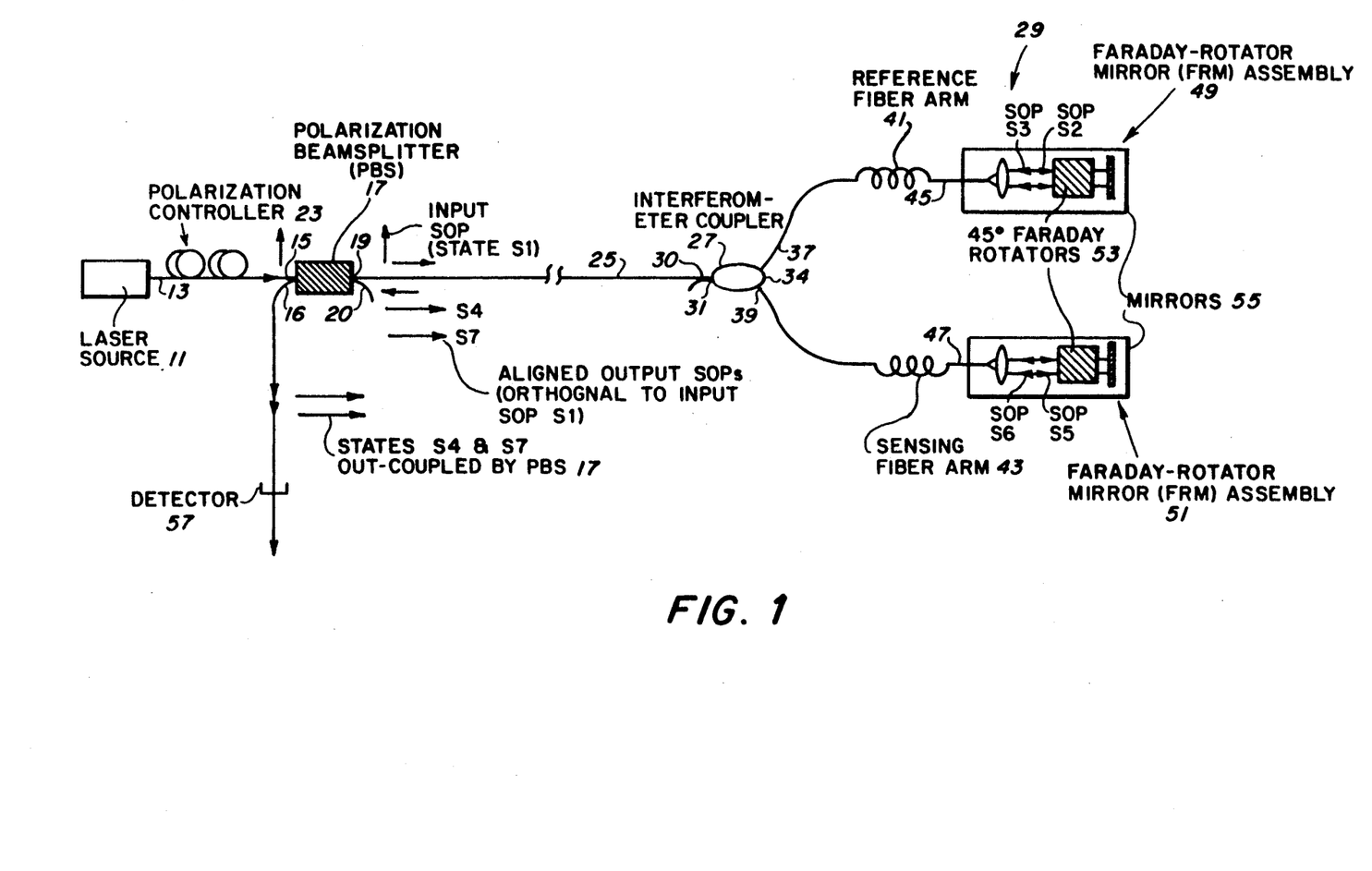
FIG. 1 illustrates a first embodiment of the invention.

Referring now to the drawings, FIG. 1 illustrates a first embodiment of a polarization-independent fiber optic Michelson interferometric sensor system of the invention.

In FIG. 1, light from a laser source 11, such as a diode laser, is focused by a lens (not shown) into an optical fiber 13 and propagates through the fiber 13 to an input port 15 of a polarization beam splitter (PBS) 17. The PBS 17 also has another input port 16 and two output ports 19 and 20. As is well known, the PBS 17 is polarization dependent.

In the operation of the PBS 17, input light that is applied to input port 15 is split between output ports 19 and 20 in a wa that is determined by the polarization state of the input light. For purposes of this discussion, assume that only vertically polarized light is outputted from output port 19 and only horizontally polarized light is outputted from output port 20. If this input light that is being applied to input port 15 is completely vertically polarized, that light is coupled directly through the PBS 17 to its output port 19. On the other hand, if that input light is completely horizontally polarized, that light is coupled directly through the PBS 17 to its other output port 20. So the PBS 17 resolves the input state of polarization (SOP) of the input light into vertically and horizontally polarized components of light and directs the vertically polarized component to output port 19 and the horizontally polarized component to output port 20.

To insure that the polarization state of the input light at input port 15 is, for example, vertically polarized, so that all of the input light will couple out of output port 19 of the PBS 17, some form of polarization control is coupled between the laser source 11 (and lens combination) and the polarization beam splitter 17. This polarization control could be a high-birefringence, polarization-preserving fiber (not shown) which would be substituted for the optical fiber 13, and which would be rotationally adjusted at the input port 15 so that the input light to port 15 would be vertically polarized. As an alternative, the polarization control could be a polarization controller 23 (shown in FIG. 1). The polarization controller 23, which is just a few loops of fiber, is inserted in the optical fiber 13. The length of the polarization controller 23 would initially be adjusted so that only vertically polarized light would be at the input port 15. The output port 20 would be monitored with a detector (not shown) and the selected polarization control adjusted to change the polarization state of the light propagating in the fiber 13 to develop a zero detector output. A zero output at the detector would indicate that all of the input light is vertically polarized and being coupled through the PBS 17 to the output port 19, and that none of such input light is horizontally polarized.

The light at output port 19 of the PBS 17 propagates through a relatively long length of ordinary input fiber 25 to an interferometer coupler 27 in a fiber optic Michelson interferometer sensor 29. The coupler 27 is a 3 dB coupler and has input ports 30 and 31 and output ports 33 and 34. Light from the fiber 25 enters the input port 30 of the coupler 27 and splits into two substantially equal portions which respectively propagate to output ports 33 and 34 of the coupler.

Proximal ends 37 and 39 of reference and sensing fiber arms 41 and 43 are respectively coupled to the output ports 33 and 34 of the coupler. Distal ends 45 and 47 of the reference and sensing fiber arms 41 and 43 are respectively pigtail coupled to Faraday rotator mirror (FRM) assemblies 49 and 51. Reference fiber arm 41 is shielded from environmental effects to provide an optical reference signal for a measurand signal (such as an acoustic, magnetic or electric signal) being sensed by the sensing fiber arm 43. Each of the Faraday rotator mirror assemblies 49 and 51 is comprised of a 45° Faraday rotator 53 and a flat, highly-reflective mirror 55.

To better understand the polarization-independent operation of the fiber optic Michelson interferometric sensor system of FIG. 1, the changes in the polarization states as the light travels through the system will now be analyzed. It should first be pointed out that any change in the state of polarization of light will depend on factors, such as temperature, bends and kinks in the fiber, and mechanical perturbations in the fiber. Furthermore, the polarization state of light that enters a fiber will continuously evolve as that light passes down that fiber.

It will be recalled that the state of polarization (SOP) of the light at the output port 19 of the PBS 17 was initially assumed to be vertically polarized and that this light was injected into the input fiber 25 at the output port 19. Thus, as shown in FIG. 1, let the input SOP polarization state at output port 19 be represented by S1, and the vertical polarization of the light at output port 19 be designated by a vertically pointing arrow.

The light from output port 19 propagates down the fiber 25, passes through interferometer coupler 27 and splits into two parts which respectively enter the reference and sensing fiber arms 41 and 43. For purposes of this discussion only the light entering the reference fiber arm 41 will be discussed at this time. The light has an arbitrary SOP, designated as S2, upon arriving at the distal end 45 of the reference fiber arm 41 (adjacent to the Faraday rotator 53 in the assembly 49), since its polarization was continuously evolving as it passed through the input fiber 25 and the reference fiber arm 41. The light with the SOP of S2 passes through the 45 Faraday rotator 53 which rotates the azimuth of the S2 polarization state by 45° on the one passage therethrough. This light is then reflected by the mirror 55 in the assembly 49 back through the 45° Faraday rotator 53 which rotates the azimuth of the S2 polarization state by another 45° on the second passage therethrough. These two 45° rotations convert the polarization state from the arbitrary SOP of S2 into an SOP S3 which has been rotated by a total of 90°. In addition, the handedness of the polarization state, or direction in which it rotates, has been reversed by the reflection from the mirror 55. The two polarization states S2 and S3 are therefore orthogonal to each other.

The light with the orthogonal polarization state of S3 at the output of the assembly 49 is injected into the reference fiber arm 41 and propagates through the reference fiber arm 41, the coupler 27 and the input fiber 25 back to the output port 19 of PBS 17. In returning to the output port 19, all of the polarization changes and all of the birefringence effects on the light will essentially cause an unfolding of the polarization evolution which initially occurred in the initial optical path down to the assembly 49. As a result, the light will return to output port 19 of the PBS 17 in a polarization state, designated as output SOP S4, which is orthogonal to polarization state of input SOP S1, which initially entered the proximal end of the input fiber 25. This result will hold, regardless of what the birefringence effects are in the input fiber 25 and in the reference fiber arm 41.

A similar operation holds when light of input SOP S1 from the output port 19 of PBS 17 propagates through the input fiber 25, the coupler 27 and the sensing fiber arm 43. In this case, the light has an arbitrary SOP, designated as S5, upon arriving at the distal end 47 of the sensing fiber arm 43 (adjacent to the Faraday rotator 53 in the assembly 51), since its polarization was continuously evolving as it passed through the input fiber 25 and the sensing fiber arm 41. The light with the SOP of S5 passes through the 45. Faraday rotator 53 which rotates the azimuth of the S5 polarization state by 45° on the first passage therethrough. This light is then reflected by the mirror 55 in the assembly 51 back through the 45° Faraday rotator 53 which rotates the azimuth of the S5 polarization state by another 45° on the second passage therethrough. These two 45° rotations convert the polarization state from the arbitrary SOP of S5 into an SOP S6 which has been rotated by a total of 90°. In addition, the handedness of the polarization state, or direction in which it rotates, has been reversed by the reflection from the mirror 55. The two polarization states S5 and S6 are therefore orthogonal to each other.

The light with the orthogonal polarization state of S6 at the output of the assembly 51 is injected into the sensing fiber arm 43 and propagates through the sensing fiber arm 43, the coupler 27 and the input fiber 25 back to the output port 19 of PBS 17. In returning to the output port 19, the state of polarization S5 undergoes reciprocal birefringence effects in the sensing fiber arm 43 and in the input fiber 25 and returns to the output port 19 in an output SOP S7 which is orthogonal to the polarization state of input SOP S1, which initially entered the proximal end of the input fiber 25.

So if SOP S4 and SOP S7 are both orthogonal to SOP 1, then SOP 4 and SOP 7 must be aligned with each other. These polarization states of SOP 4 and SOP 7 will always be aligned with each other, no matter what happens to the birefringence effects in the arms 41 and 43 of the fiber optic Michelson interferometer sensor 29. As a result, this means that the visibility at the output is always maintained at its optimum value.

Since each of the polarization states S4 and S7 is orthogonal to SOP 1, the states S4 and S7 must be horizontally polarized. As a result, the horizontally polarized light with the polarization states of S4 and S7 that is being applied to output port 19 will be coupled directly through the PBS 17 to the input port 16. A detector or photodetector 57 is optically coupled to the input port 16 to detect any interference pattern that was developed by the fiber optic Michelson interferometer sensor 29. Since all or substantially all of the light returned to the output port 19 with a horizontal polarization, all of that light will be optically coupled to the detector 57 for detection, and virtually none of that light will return to the laser source.

Figure 2:
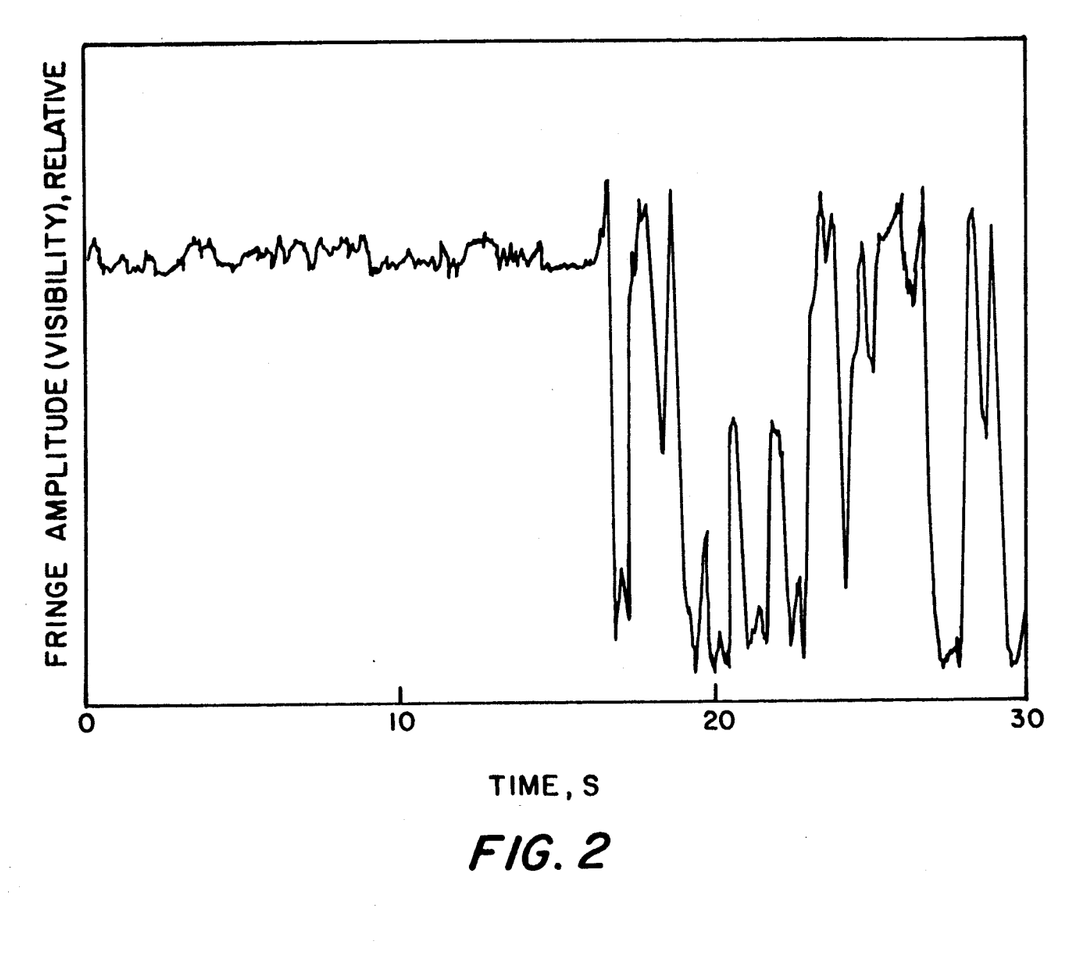
FIGS. 2 and 3 illustrates waveforms useful in understanding the operation of the invention.

FIG. 2 shows the effect of random manual adjustment of the input polarization to the fiber optic Michelson interferometric sensor 29 of FIG. 1 with the 45° Faraday rotators 53 removed from the sensor. In this 'conventional' mode of operation of a Michelson interferometric sensor, such random polarization changes lead to variations in the output fringe amplitude (visibility), and give rise to the problem of polarization induced fading. The depth of the fading due to input SOP variation is determined by the difference in the birefringence properties of the two fiber arms, which in this case was set to give a relatively strong fading condition.

As is illustrated in the waveform trace in FIG. 2, the fringe amplitude of visibility was set at a preselected level and for the first 15 or so seconds the fibers in the Michelson interferometer were left unperturbed at that level. Then the fibers in the Michelson interferometer (the input fiber and the fiber in one of the arms) were perturbed. Large changes in the visibility resulted—some very close to zero.

Figure 3:
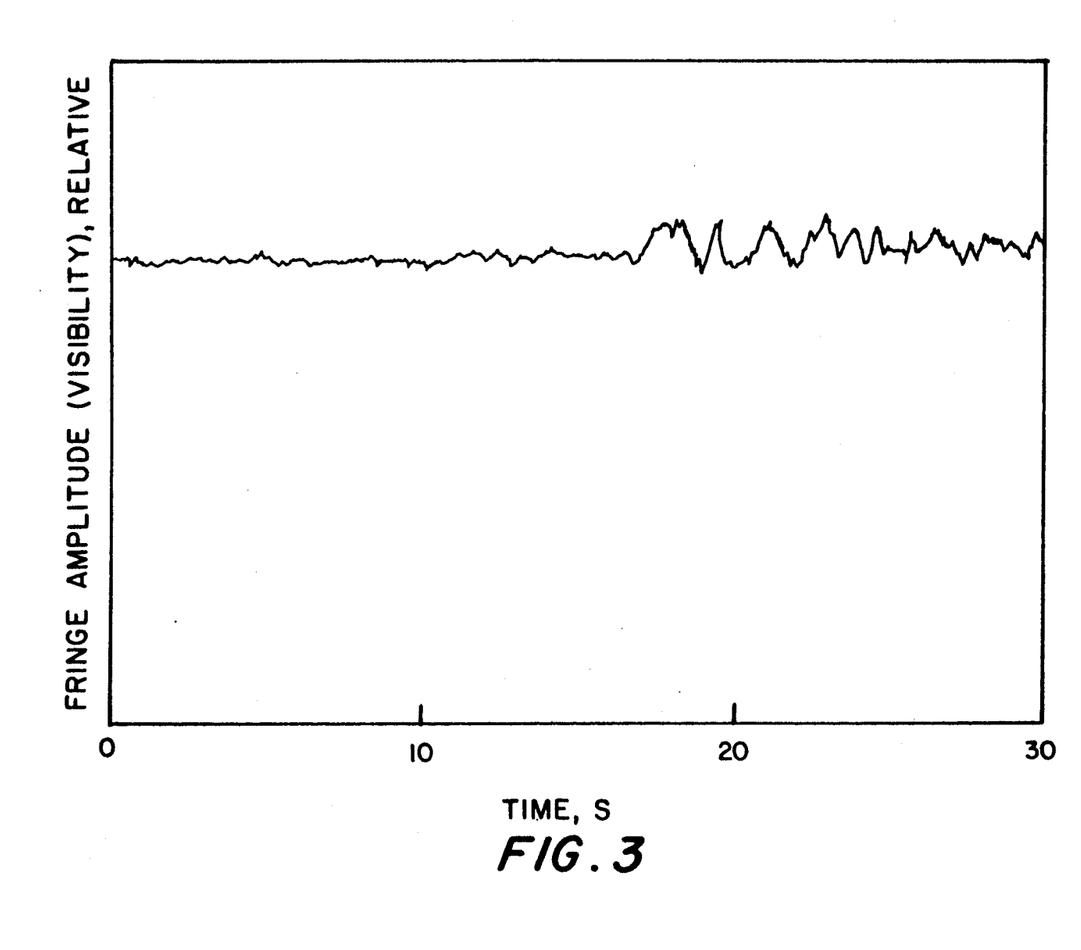

FIG. 3 shows the type of performance that was obtained when the Faraday rotators 53 were used in the system of FIG. 1. In this case, the two polarization states (S4 and S7 in FIG. 1)) are returned in the same state of polarization, orthogonal to the input polarization state (S1), as discussed in relation to FIG. 1.

As is illustrated in the waveform trace shown in FIG. 3, for the first 15 or so seconds of the trace the fibers in the Michelson interferometer sensor system of FIG. 1 were left unperturbed. Then the birefringence in the fibers was varied. This perturbation of the fibers gave rise to a small fluctuation in visibility, but much weaker than in the unstabilized case shown in FIG. 2.

Figure 4:
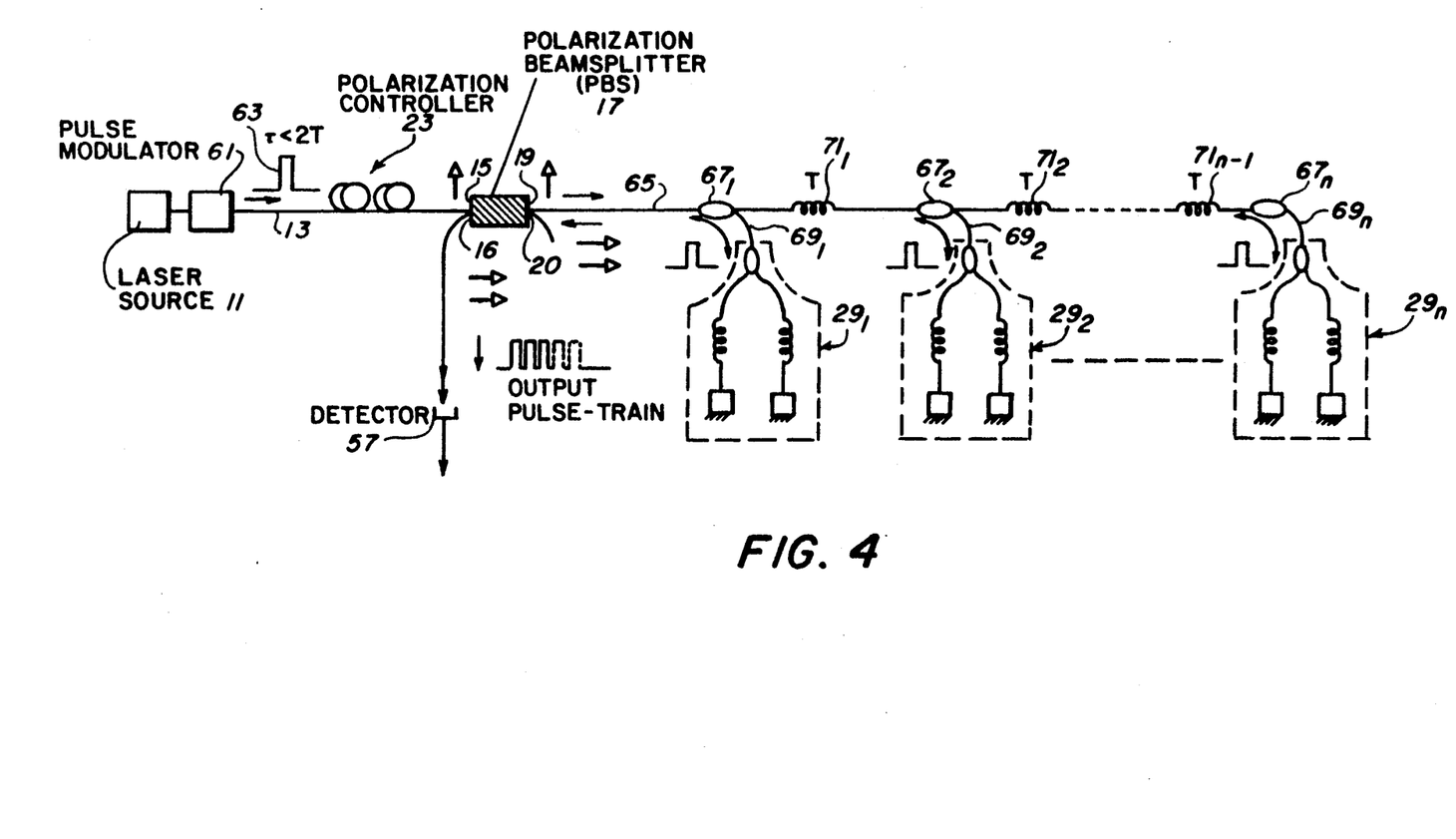
FIG. 4 illustrates a second embodiment of the invention.

Referring now to FIG. 4, a second embodiment of the invention is shown. More specifically, FIG. 4 illustrates a fiber optic array of Michelson interferometer sensors arranged in a ladder network of discrete Michelson interferometer sensors.

In the embodiment of FIG. 4, light from a laser source 11 is applied to a pulse modulator 61 to develop light pulses having an interpulse period of 2nT (to be explained) and a pulse width ($\tau$) less than 2T ($\tau < 2T$). Each light pulse 63 from the pulse modulator 61 is focused by a lens (not shown) into an optical fiber 13 and propagates through the fiber 13 and a polarization controller 23 to an input port 15 of a polarization beam splitter 17. The polarization controller 23 is adjusted so that the light pulse 63 has a vertical polarization when it arrives at port 15 of the PBS 17, as discussed in FIG. 1. The structure and functions of the laser source 11, optical fiber 13, polarization controller 23 and PBS 17 have been discussed before in relation to FIG. 1 and, hence, require no additional explanation.

The vertically polarized light pulse 63 from the output port 19 of PBS 17 propagates through a relatively long length of ordinary input fiber 65, with predetermined portions of the power in each light pulse being respectively tapped off by a series of n optical couplers $67_1, 67_2, \ldots 67_n$ disposed in preselected positions along the input fiber 65. A group of n fiber optic Michelson interferometer sensors $29_1, 29_2, \ldots 29_n$ is respectively coupled to the n optical couplers $67_1, 67_2, \ldots 67_n$ by way of respective connecting optical fibers $69_1, 69_2$ to selectively receive the tapped off, predetermined portions of power in a light pulse. Delay coils $71_1, 71_2, \ldots 71_{n-1}$ are respectively interposed between adjacent pairs of the optical couplers $67_1, 67_2, \ldots 67_n$ (e.g.; $67_1$ and $67_2$, $67_2$ and $67_3$, ... $67_{n-1}$ and $67_n$) to provide a delay of T between adjacent pairs of Michelson interferometer sensors, namely between $29_1$ and $29_2$, between $29_2$ and $29_3$, ... and between $29_{n-1}$ and $29_n$.

Each of the fiber optic Michelson interferometer sensors $29_1, 29_2, \ldots 29_n$ is similar in structure and operation to the fiber optic Michelson interferometer sensor 29 of FIG. 1 and, hence, requires no further description. Since each of the Michelson interferometer sensors $29_1, 29_2, \ldots 29_n$ has the Faraday rotator mirror assemblies 49 and 51 in the respective reference and sensing arms 41 and 43 (as shown in FIG. 1), optimum visibility will be obtained from each of the Michelson interferometer sensors $29_1, 29_2, \ldots 29_n$.

The light pulses from the Michelson interferometer sensors $29_1, 29_2, \ldots 29_n$ respectively return through the optical fibers $69_1, 69_2, \ldots 69_n$ to the input fiber 65 and form a sequence of light pulses separated from each other by a time 2T. When each of the pulses in this sequence of pulses returns to output port 19 of PBS 17 it is horizontally polarized. As a result, the PBS 17 will sequentially direct this sequence of horizontally polarized pulses out of input port 16 to the detector 57 which sequentially detects any interference patterns that may have been developed by the array of Michelson interferometer sensors $29_1, 29_2, \ldots 29_n$.

Since one of the delay coils $71_1, 71_2, \ldots 71_{n-1}$ is interposed between each adjacent pair of the optical couplers $67_1, 67_2, \ldots 67_n$, the round trip time in passing and returning through a delay coil is 2T. Since there is a series of n return pulses, the total time between the generation of a light pulse by the pulse modulator 61 and when the last pulse in a sequence of return pulses is applied to the detector 57 is 2nT. Thus, there must be an interpulse period between two adjacent light pulses from the pulse modulator 61 of an least 2nT, where n is some integer number and T is the delay time of one of the delay coils $71_1, 71_2, \ldots 71_{n-1}$.

In the array of FIG. 4, it has been shown that optimum visibility has been achieved in each of the sensors in the array of Michelson interferometer sensors $29_1, 29_2, \ldots 29_n$, that isolation between the laser source 11 and the sequence of return pulses from the array of Michelson interferometer sensors $29_1, 29_2, \ldots 29_n$ has been achieved with a maximization of optical power to be detected by the detector 57, and that the light pulses being returned from the array of Michelson interferometer sensors $29_1, 29_2, \ldots 29_n$ have been time division multiplexed.

Figure 5:
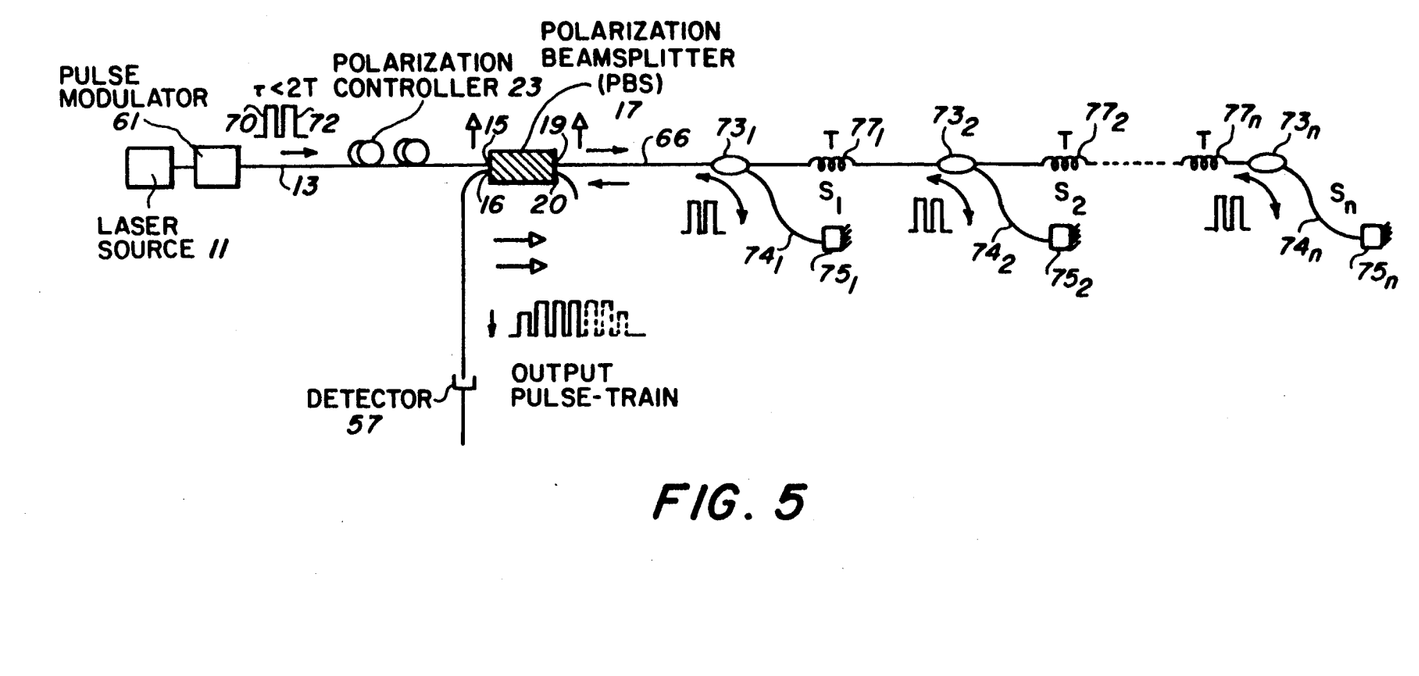
FIG. 5 illustrates a third embodiment of the invention.

Referring now to FIG. 5, a third embodiment of the invention is shown. More specifically, FIG. 5 illustrates an in-line serial array of Michelson sensors in conformance with the invention. The waveforms shown in FIG. 6 will also be discussed during the discussion of FIG. 5 for a better understanding of the operation of the embodiment of FIG. 5.

The embodiment of FIG. 5 includes the laser source 11, pulse modulator 61, optical fiber 13, polarization controller 23, PBS 17 and detector 57 that have been discussed before in relation to FIG. 4 and hence require no additional explanation. However, the operation of the pulse modulator 61 has been modified so that it periodically generates two consecutive light pulses 70 and 72 for each transmission and then remains quiescent until the next transmission, at which time it again generates two consecutive light pulses 70 and 72. The pulse width of each of the two consecutive light pulses 70 and 72 is less than 2T.

The vertically polarized light pulses 70 and 72 from the output port 19 of PBS 17 propagate through a relatively long length of ordinary input fiber 66, with portions of the power in each of the consecutive light pulses 70 and 72 being tapped off by a series of n optical couplers $73_1, 73_2, \ldots 73_n$ disposed in preselected positions along the input fiber 66. A plurality of Faraday rotator mirror assemblies $75_1, 75_2, \ldots 75_n$, each identical in structure and operation to either of the Faraday rotator mirror assemblies 49 and 51 in FIG. 1, are respectively coupled to the n optical couplers $73_1, 73_2, \ldots 73_n$ by way of respective fiber arms $74_1, 74_2, \ldots 74_n$. Delay/sensing coils $77_1, 77_2, \ldots 77_{n-1}$ are respectively disposed between adjacent pairs of the optical couplers $73_1, 73_2, \ldots 73_n$ (e.g.: $73_1$ and $73_2$, $73_2$ and $73_3$, ... $73_{n-1}$ and $73_n$) to provide a delay of T therebetween.

Each of the Michelson interferometers $S_1, S_2, \ldots S_n$ in the array in FIG. 5 is formed by two paths or arms. The first Michelson interferometer $S_1$ is formed by the arm that includes the couplers $73_1$, the fiber arm $74_1$ and the Faraday rotator mirror assembly $75_1$ and by the arm that includes the coupler $73_1$, delay/sensing coil $77_1$, coupler $73_2$, fiber arm $74_2$ and Faraday rotator mirror assembly $75_2$. These two paths or arms basically form the Michelson interferometer $S_1$.

The second interferometer in the series is formed by the arm that includes the coupler $73_2$, fiber arm $74_2$ and Faraday rotator mirror assembly $75_2$ and the arm that includes the coupler $73_2$, delay/sensing coil $77_2$, coupler $73_3$ (not shown), fiber arm $74_3$ (not shown) and Faraday rotator mirror assembly $75_3$ (not shown). These two arms form the Michelson interferometer $S_2$. The remaining Michelson interferometers $S_3 \ldots S_n$ in the system are similarly formed.

Figure 6:
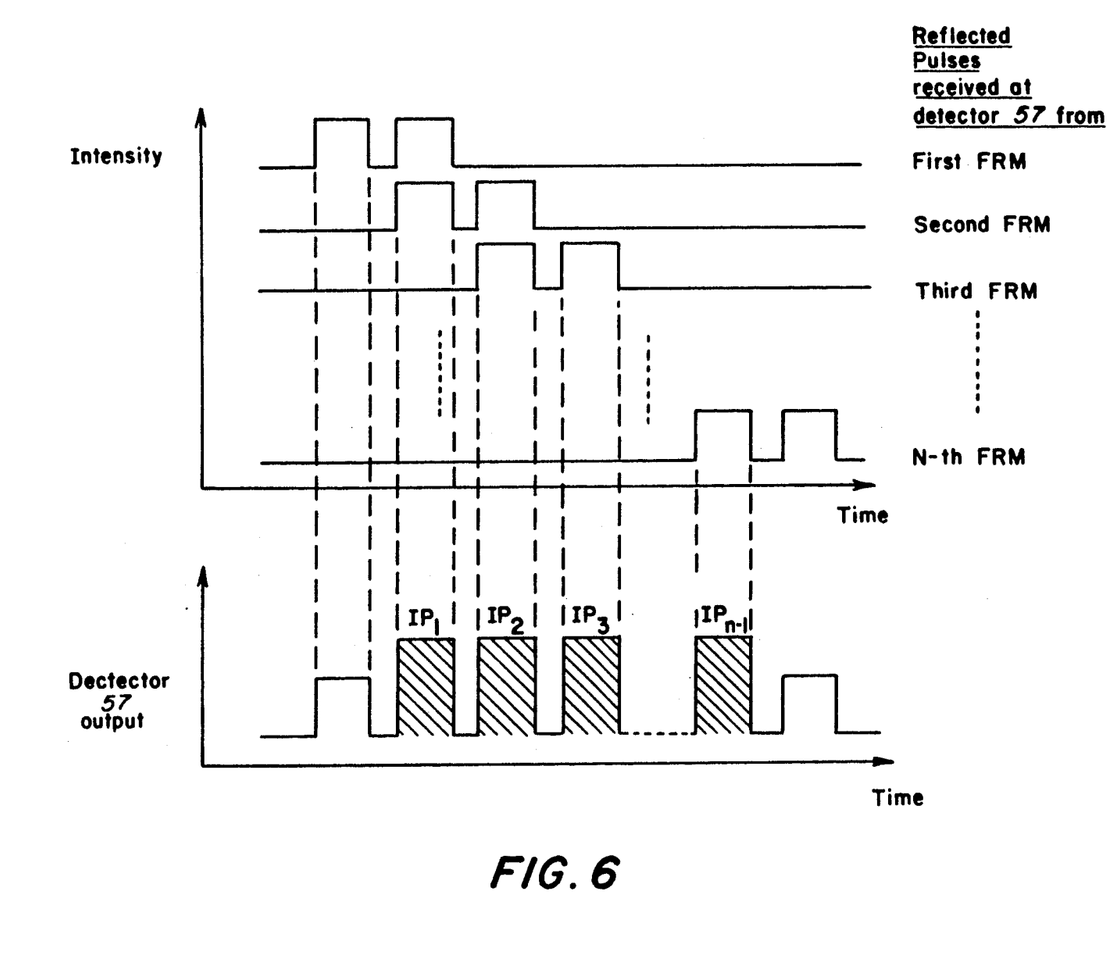
FIG. 6 illustrates waveforms useful in understanding the operation of the third embodiment of FIG. 5.

The array of Michelson interferometers $S_1 \ldots S_n$ Are addressed by the consecutive light pulses 70 and 71 that are put into the system. These two pulses 70 and 72 propagate down the input fiber 66 and return off the first Faraday rotator mirror assembly $75_1$ and are shown in FIG. 6 as the "pulses received at the detector (57) from first FRM ($75_1$". These same two pulses 70 and 72 also propagate further down the input fiber 66, are delayed by time T in passing through the delay/sensor coil $77_1$, return off the second Faraday rotator mirror assembly $75_2$, are delayed again by another time T in returning through delay/sensor coil $77_1$, and are shown in FIG. 6 as the "pulses received at detector (57) from second FRM ($75_2$)". Because of the 2T round trip delay in passing through the delay/sensor coil $77_1$, only the first pulse of the two pulses reflected off of the second FRM $75_2$ will overlap the second pulse of the two pulses reflected off of the first FRM $75_1$ to produce an interference pattern $IP_1$ at the detector 57, as shown in FIG. 6. This same effect will be realized by the pulses received at the detector 57 from the third FRM 75₃. Only the first pulse of the two pulses reflected off of the third FRM 75₃ will overlap the second pulse of the two pulses reflected off of the second FRM 75₂ to produce an interference pattern IP₂ at the detector 57, as shown in FIG. 6. A similar operation will hold for each pair of pulses reflected off of subsequent FRMs in the array.

Therefore, what has been described in the preferred embodiments of the invention is a fiber optic Michelson interferometric sensor system with passive elimination of polarization fading and source feedback isolation. In operation, an optical source provides light of a first polarization state to a polarization selective element. Output light from the polarization selective element passes through a length of optical fiber into one or more Michelson interferometric sensor branches Each branch utilizes an associated Faraday rotator/mirror assembly, which assembly is coupled to distal ends of sensing and reference arms of the Michelson interferometer sensor in that branch, to provide for the passive elimination of polarization fading in that branch. The polarization selective element at the output of the optical source provides isolation of the optical source from the returned optical signals from the Michelson interferometer sensor system.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A polarization-independent fiber optic interferometric sensor system comprising:
    a polarization beamsplitter having first and second input ports and first and second output ports, said polarization beamsplitter being responsive to light applied to said first input port for coupling light of a first polarization state from said first input port to said first output port and light of a second polarization state orthogonal to said first polarization state from said first input port to said second output port and being further responsive to light applied to said first output port of said second polarization state for coupling said light to said second input port;
    optical source means coupled to said polarization beamsplitter for providing light of said first polarization state to said first input port;
    an interferometer including an optical coupler having third and fourth input ports and third and fourth output ports, sensing and reference arms having different associated birefringences and being respectively coupled to said third and fourth output ports, and first and second Faraday rotator mirror assemblies respectively coupled to distal ends of said sensing and reference arms;
    means for conveying said light of said first polarization state from said first output port to said third input port of said optical coupler, said conveying means having a birefringence which changes the polarization of said light of said first polarization state to a first arbitrary polarization state, said output coupler allowing first and second portions of said light of said first arbitrary polarization state to respectively pass into said sensing and reference fiber arms to produce respective second and third arbitrary polarization states at said distal ends of said sensing and reference fibers, said first and second Faraday rotator mirror assemblies respectively converting said first and second portions of light of said second and third arbitrary polarization states into first and second portions of light of fourth and fifth arbitrary polarization states, said sensing and reference arms being responsive to light passing therethrough for developing an interference pattern output, said optical coupler combining said first and second portions of light of said fourth and fifth arbitrary polarization states into a beam of light and passing said beam of light through said conveying means to produce said second polarization state at said first output port of said polarization beam splitter, said beam of light of said second polarization state passing through said polarization beam splitter to substantially only said second input port of said polarization beam splitter; and
    photodetection means responsive to said interference pattern output for developing an electrical signal that has a peak-to-peak amplitude proportional to the visibility of said interference pattern output.

2. The fiber optical interferometric sensor system of claim 1 wherein said optical source means includes:
    a laser for generating light; and
    a polarization controller coupled between said laser and said polarization beamsplitter and being responsive to said light from said laser for supplying light of said first polarization state to said first input port.

3. The fiber optic interferometric sensor system of claim 1 wherein:
    said conveying means is a length of ordinary fiber coupled between said first output port of said polarization beamsplitter and said third input port of said optical coupler.

4. The fiber optic interferometric sensor system of claim 1 wherein:
    said interferometer is a fiber optic Michelson interferometer.

5. The fiber optic interferometric sensor system of claim 1 wherein each of said first and second Faraday rotator mirror assemblies includes:
    a Faraday rotator for rotating the state of polarization of light passing therethrough by 45°; and
    a mirror for reflecting the polarization-rotated light from said Faraday rotator back through said Faraday rotator to enable said Faraday rotator to rotate the polarization state of said polarization-rotated light by another 45° on its second passage therethrough.

6. A polarization-independent fiber optic interferometric sensor system comprising:
    optical source means for providing light of a first polarization state;
    a polarization beamsplitter having first and second input ports and first and second output ports and being coupled to said optical source means, said polarization beamsplitter being responsive to the application of said light of said first polarization state to said first input port for coupling said light from said first input port to said first output port;
    means coupled to said first output port for conveying said light of said first polarization state from said first output port to a distal end of said conveying means, said conveying means having a birefringence which changes the polarization state of said light of said first polarization state to a first arbitrary polarization state at said distal end of said conveying means;

a fiber Michelson interferometer including: an optical coupler having third and fourth output ports and a third input port coupled to the distal end of said conveying means, sensing and reference fiber arms having different associated birefringences and being coupled at respective proximal ends thereof to said third and fourth output ports of said optical coupler for passing first and second portions of said light of said first arbitrary polarization state therethrough to produce respective second and third arbitrary polarization states at respective distal ends of said sensing and reference arms, and first and second Faraday rotator mirror assemblies respectively disposed at the distal ends of said sensing and reference fiber arms for converting said first and second portions of light of said second and third arbitrary polarization states into first and second portions of light of fourth and fifth arbitrary polarization states, said optical coupler combining said first and second portions of said fourth and fifth polarization states into a beam of light and allowing said beam of light to pass through said conveying means to produce said second polarization state at said first output port, said beam of light of said second polarization state passing through said polarization beam splitter to substantially only said second input port; and output means coupled to said second input port of said polarization beamsplitter and being responsive to any interference pattern contained in said beam of light for developing an electrical signal that has a peak-to-peak amplitude proportional to the visibility of said interference pattern.

7. The fiber optic interferometric sensor system of claim 6 wherein:

said optical source means includes:

a laser for generating light; and a polarization controller coupled between said laser and said polarization beamsplitter and being responsive to said light from said laser for supplying light of said first polarization state to said first input port;

said conveying means is a length of ordinary fiber coupled between said first output port of said polarization beamsplitter and said third input port of said optical coupler;

said interferometer is a fiber optic Michelson interferometer; and each of said first and second Faraday rotator mirror assemblies includes:

a Faraday rotator for rotating the state of polarization of light passing therethrough by 45°; and a mirror for reflecting the polarization-rotated light from said Faraday rotator back through said Faraday rotator to enable said Faraday rotator to rotate the polarization state of said polarization-rotated light by another 45° on its second passage therethrough.

8. A polarization-independent fiber optic interferometric sensor system comprising:

optical source means for providing a pulse of light of a first polarization state;

a polarization beamsplitter having first and second input ports and first and second output ports and being coupled to said optical source means, said polarization beamsplitter being responsive to the application of said pulse of light of said first polarization state to said first input port for coupling said pulse of light from said first input port to said first output port;

an input fiber having a birefringence and having proximal end coupled to said first output port;

a plurality of serially-coupled optical couplers serially disposed along said input fiber;

a plurality of delay elements, each of delay T, interleaved between adjacent ones of said plurality of optical couplers;

a plurality of fiber Michelson interferometers respectively coupled to said plurality of optical couplers, each of said fiber Michelson interferometers including: a coupler having third and fourth output ports and a third input port coupled to an associated one of said plurality of serially-coupled optical couplers, said birefringence of said input fiber changing the polarization state of said pulse of light of said first polarization state to an associated first arbitrary polarization state at said coupler, sensing and reference arms having difference associated birefringences and being respectively coupled at proximal ends thereof to said third and fourth output ports of said coupler for passing first and second portions of said light of said first arbitrary polarization state therethrough to produce respective second and third arbitrary polarization states at respective distal ends of said sensing and reference arms, and first and second Faraday rotator mirror assemblies respectively coupled to distal ends of said sensing and reference arms for converting said first and second portions of light of said associated second and third arbitrary polarization states into first and second portions of associated fourth and fifth arbitrary polarization states, said optical coupler combining said first and second portions of said associated fourth and fifth polarization states into an associated pulse of light and allowing said associated pulse of light to pass through its associated one of said plurality of serially-coupled optical couplers into said input fiber, said associated pulse from each of said plurality of serially-coupled optical couplers combining into a sequence of pulses along said input fiber which pulses return through associated ones of said delay elements to said first output port of said polarization beamsplitter, each pulse in said sequence of pulses having said second polarization state upon its arrival at said first output port, said sequence of pulses of light sequentially passing through said polarization beamsplitter to said second input port; and output means coupled to said second input port of said polarization beamsplitter and being responsive to any interference pattern contained in any one of said sequence of pulses of light for developing an associated electrical signal that has a peak-to-peak amplitude proportional to the visibility of said interference pattern.

9. The fiber optic interferometric sensor system of claim 8 wherein said optical source means includes:

a laser for generating light;

a pulse modulator responsive to said light from said laser for developing a sequence of light pulses; and a polarization controller responsive to each said light pulse from said pulse modulator for supplying a light pulse of said first polarization state to said first input port.

10. The fiber optic interferometer sensor system of claim 8 wherein:
said input fiber is a length of ordinary input fiber.

11. The fiber optic interferometric sensor system of claim 8 wherein each of said first and second Faraday rotator mirror assemblies of each of said fiber Michelson interferometers includes:
a Faraday rotator for rotating the state of polarization of light passing therethrough by 45°; and
a mirror for reflecting the polarization-rotated light from said Faraday rotator back through said Faraday rotator to enable said Faraday rotator to rotate the polarization state of said polarization-rotated light by another 45° on its second passage therethrough.

12. The fiber optic interferometer sensor system of claim 8 wherein:
said output means is a photodetector.

13. The fiber optic interferometer sensor system of claim 8 wherein:
said optical source means includes:
a laser for generating light;
a pulse modulator responsive to said light from said laser for developing a sequence of light pulses; and
a polarization controller responsive to each said light pulse from said pulse modulator for supplying a light pulse of said first polarization state to said first input port;
said input fiber is a length of ordinary input fiber;
each of said first and second Faraday rotator mirror assemblies of each of said fiber Michelson interferometers includes:
a Faraday rotator for rotating the state of polarization of light passing therethrough by 45°; and
a mirror for reflecting the polarization-rotated light from said Faraday rotator back through said Faraday rotator to enable said Faraday rotator the polarization state of said polarization-rotated light by another 45° on its second passage therethrough; and
said output means is a photodetector.

14. A polarization-independent fiber optic interferometric sensor system comprising:
optical source means for providing consecutive first and second pulses of light of a first polarization state;
a polarization beamsplitter having first and second input ports and first and second output ports and being coupled to said optical source means, said polarization beamsplitter being responsive to the application of said consecutive first and second pulses of light of said first polarization state to said first input port for coupling said consecutive first and second pulses of light from said first input port to said first output port;
an input fiber having a birefringence and having a proximal end coupled to said first output port;
a plurality of optical couplers serially disposed along said input fiber for respectively tapping off portions of the light in each of said consecutive first and second pulses of light;
a plurality of delay sensing coils, each of delay T, interleaved between adjacent ones of said plurality of optical couplers;
a plurality of Faraday rotator mirror assemblies, each said Faraday rotator mirror assembly reflecting light applied thereto back with a change in polarization;
a plurality of fiber arms respectively coupled between associated ones of said plurality of optical couplers and associated ones of said plurality of Faraday rotator mirror assemblies, said pluralities of optical couplers, fiber arms, Faraday rotator mirror assemblies and delay sensing coils forming a plurality of fiber Michelson interferometers, each of said fiber Michelson interferometers including:
a first arm having an associated first optical coupler coupled by way of an associated first fiber arm to an associated first said Faraday rotator mirror assembly; and
a second arm having said associated first optical coupler serially coupled by way of an adjacent said delay sensing coil to an associated second optical coupler, and an associated second fiber arm coupled between said associated second optical coupler and an adjacent second Faraday rotator mirror assembly, said first and second Faraday rotator mirror assemblies in each of said plurality of fiber Michelson interferometers changing the polarization states of the portions of the light in each of said consecutive first and second pulses of light and returning such light by way of said input fiber to said first output port of said polarization beamsplitter, each of said consecutive first and second pulses of light from each Faraday rotator mirror assembly having said second polarization state upon its arrival at said first output port and passing through said polarization beamsplitter to said second input port; and
output means coupled to said second input port of said polarization beamsplitter and being responsive to any interference pattern contained in any one of said sequence of pulses of light for developing an associated electrical signal that has a peak-to-peak amplitude proportional to the visibility of said interference pattern;
wherein, in each one of said plurality of fiber Michelson interferometers, only the first pulse of the two pulses of light reflected off of said second Faraday rotator mirror assembly will overlap the second pulse of the two pulses of light reflected off of said first Faraday rotator mirror assembly to produce an interference pattern at said output means.

15. The fiber optic interferometer sensor system of claim 14 wherein said optical source means includes:
a laser for generating light;
a pulse modulator responsive to said light from said laser for developing consecutive first and second pulses of light of a first polarization state; and
a polarization controller responsive to each of said first and second light pulses from said pulse modulator for supplying a light pulse of said first polarization state to said first input port.

16. The fiber optic interferometer sensor system of claim 14 wherein each one of said plurality of Farady rotator mirror assemblies include:
a Faraday rotator for rotating the state of polarization of light passing therethrough by 45°; and
a mirror for reflecting the polarization-rotated light back through said Faraday rotator to enable said Faraday rotator to rotate the polarization state of said polarization-rotated light by another 45° on its second passage therethrough.

17. The fiber optic interferometric sensor system of claim 14 wherein:

said input fiber is a length of ordinary input fiber.

18. The fiber optic interferometric sensor system of claim 14 wherein:

said output means is a photodetector.

* * * * *